United States Patent [19]

Maeda

[11] Patent Number: 5,274,453
[45] Date of Patent: Dec. 28, 1993

[54] IMAGE PROCESSING SYSTEM

[75] Inventor: Mitsuru Maeda, Yokohama, Japan

[73] Assignee: Canon Kabushiki Kaisha, Tokyo, Japan

[21] Appl. No.: 753,988

[22] Filed: Sep. 3, 1991

[30] Foreign Application Priority Data

Sep. 3, 1990 [JP] Japan .................. 2-230603

[51] Int. Cl.$^5$ ............................................. H04N 7/13
[52] U.S. Cl. .................... 358/183; 358/136; 358/105; 358/22
[58] Field of Search ............... 358/160, 183, 22, 105, 358/133, 136, 125; 382/48

[56] References Cited

U.S. PATENT DOCUMENTS

| | | | |
|---|---|---|---|
| 4,258,385 | 3/1981 | Greenberg et al. | 358/22 |
| 4,566,126 | 1/1986 | Miyagawa et al. | 358/22 |
| 4,602,286 | 7/1986 | Kellar et al. | 358/183 |
| 4,783,833 | 11/1988 | Kawabata et al. | 358/105 |
| 4,951,137 | 8/1990 | Kisou et al. | 358/125 |
| 5,034,986 | 7/1991 | Karmann et al. | 382/48 |

FOREIGN PATENT DOCUMENTS

| | | |
|---|---|---|
| 0344976 | 12/1989 | European Pat. Off. |
| 0371677 | 6/1990 | European Pat. Off. |
| 0414017 | 2/1991 | European Pat. Off. |
| 0128791 | 7/1985 | Japan ........... 358/22 |

OTHER PUBLICATIONS

Fourth International Colloquium On Advanced Television Systems, "Review of Techniques for Motion Estimation and Motion Compensation", E. Dubois et al., Ottwawa, Jun. 25-29, 1990, pp. 3B.3.1-3B.3.19.

*Primary Examiner*—James J. Groody
*Assistant Examiner*—David E. Harvey
*Attorney, Agent, or Firm*—Fitzpatrick, Cella, Harper & Scinto

[57] ABSTRACT

An image processing system which uses mask information to combine a plurality of images including at least one moving picture updates the mask information based upon motion information obtained from motions of corresponding points between images contained in an input moving picture. The system further encodes a synthesized image using the mask information, or, alternatively, utilizing the mask information and the motion information that has been detected. Thus, mask information is generated automatically by carrying out motion detection processing, and the mask information is utilized constructively to perform coding of the synthesized image.

11 Claims, 5 Drawing Sheets

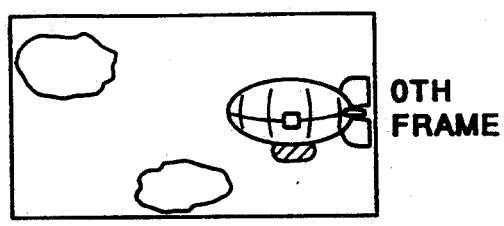
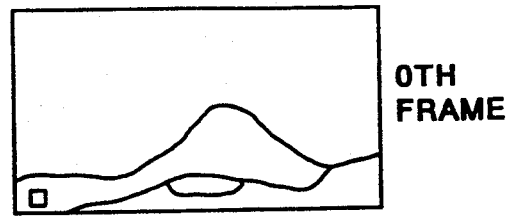
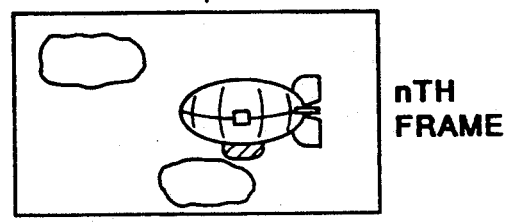
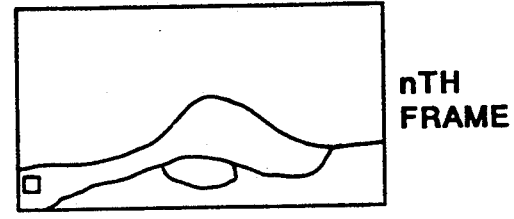
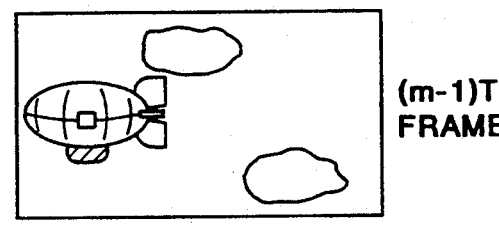
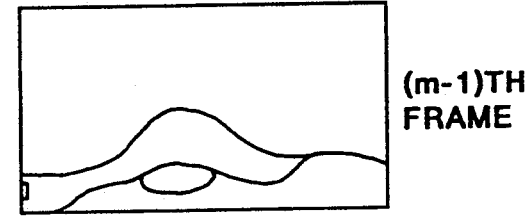
F I G. 2(A)         F I G. 2(B)
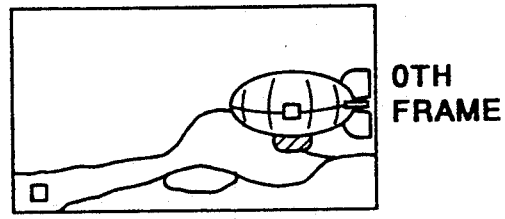
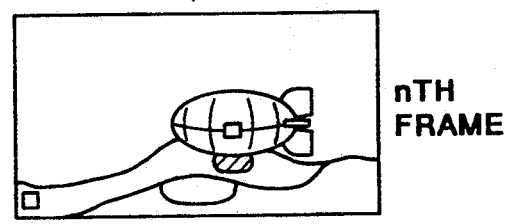
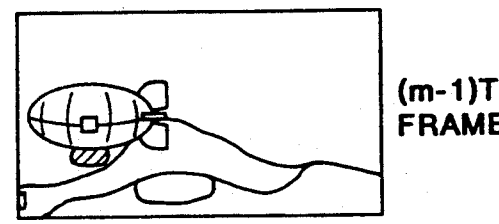
F I G. 2(C)

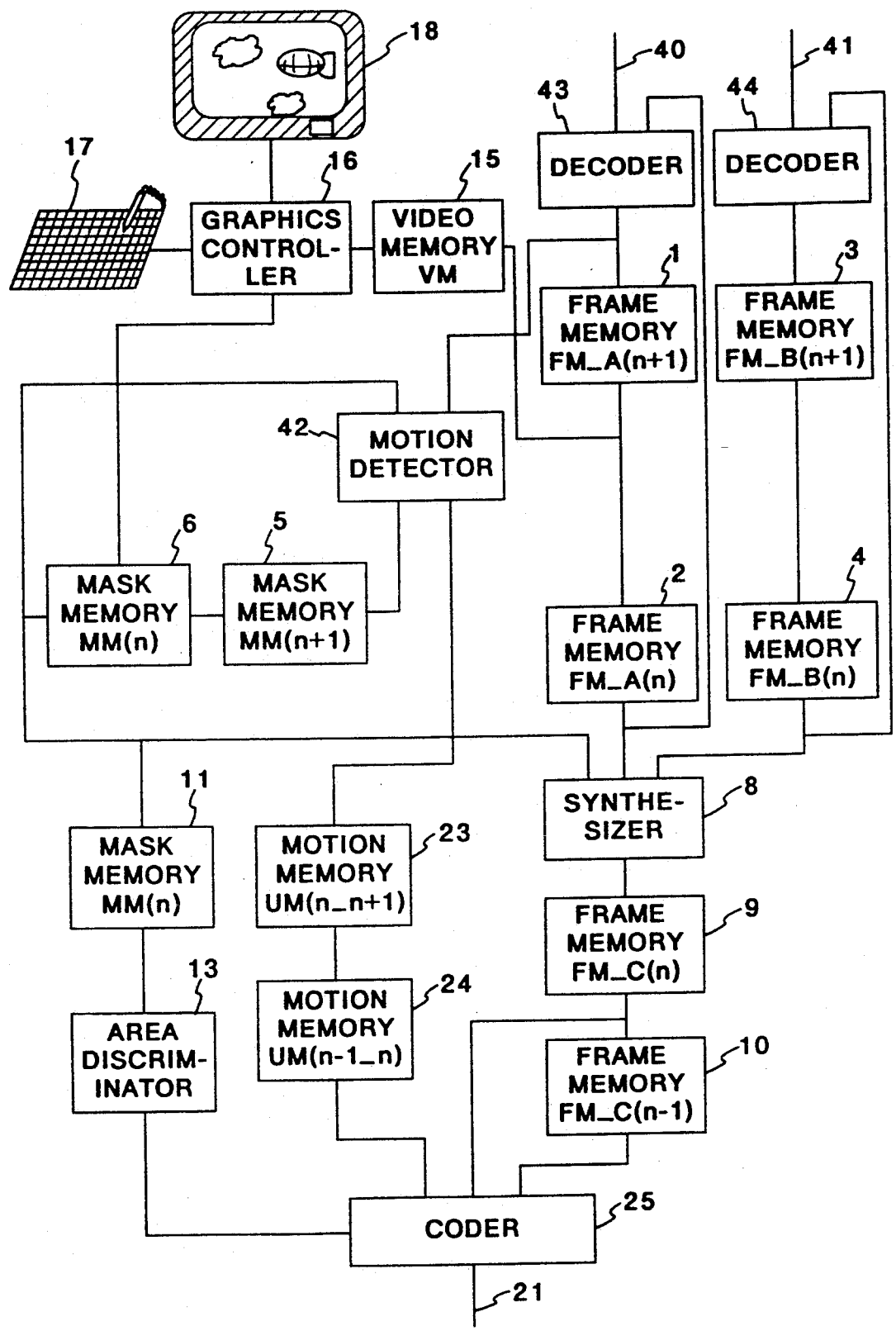
F I G. 5

IMAGE PROCESSING SYSTEM

BACKGROUND OF THE INVENTION

1. Field of the Invention

This invention relates to an image processing system and, more particularly, to an image processing system for processing and coding a plurality of moving pictures.

2. Description of the Related Art

When a plurality of images (here assumed to be two, represented by A and B) are combined and displayed in an image processing system of the type in which a subject of any desired shape in a plurality of moving pictures is cut out and displayed in combination with another image, mask information which designates the shape to be cut out is prepared for each and every frame to perform the combination of images. For example, mask data contained in the mask information comprises "0"s and "1"s, and the aforementioned images A and B are combined by executing processing in which, when the mask data of a certain pixel is "1", the data of the corresponding pixel in the image A is selected, and when the mask data of a certain pixel is "0", the data of the corresponding pixel in the image B is selected. The combined image data is capable of being stored in a frame memory or coded.

Several methods have been proposed with regard to the coding of a moving picture. A particularly useful method of moving-picture coding is a motion-compensating (MC) prediction method based upon detection of motion. Though many methods of detecting motion have been proposed, a motion-compensating prediction method using block matching will be described in brief.

First, a motion vector is obtained by searching for blocks (having similar luminance-value pattern) which will minimize the sum of the differences between blocks (e.g., 8×8 pixels) in an image of an $n^{th}$ frame, the search being performed in an image of the $(n-1)^{th}$ frame. Next, by using the motion vector, a predicted image of the $(n+1)^{th}$ frame is created from the image of the $n^{th}$ frame. A differential image between the predicted image and the input image of the $(n+1)^{th}$ frame is then coded along with the motion vector. This method of coding is known as motion-compensating prediction coding.

However, in the example of the prior art described above, an enormous amount of time is required since the object to be combined with another image must be cut out every frame.

Furthermore, the motion detection processing in such moving-picture coding requires a great amount of calculation. For example, if block size in the block-matching method is 16×16, then 256 subtraction operations and 255 addition operations will be required in the processing for finding the block-by-block differential, and this processing must be executed for all searched areas (e.g., 32×32 areas). Moreover, there is the danger of obtaining erroneous motion information, in which a pixel in a certain area corresponds to a pixel in a different area.

SUMMARY OF THE INVENTION

Accordingly, an object of the present invention is to provide an image processing system in which mask information is generated automatically by carrying out motion detecting processing, and in which the mask information is utilized constructively to perform coding of combined images.

According to the present invention, the foregoing object is attained by providing an image processing system for combining a plurality of images, which include at least one moving picture, using mask information, comprising updating means for updating the mask information based upon motion information obtained from motions of corresponding points between images contained in an input motion picture.

The system further comprises coding means for coding a synthesized image using the mask information.

The system further comprises memory means for storing the motion information that has been detected, and coding means for coding the combined image utilizing the mask information and the motion information stored in the memory means.

In the image processing system constructed as set forth above, the mask information is generated automatically, and therefore it is possible to eliminate a laborious operation in which the operator is compelled to enter mask information every frame. In addition, when the combined image is coded, reference is made to the mask information, thereby making it possible to reduce the amount of motion detecting processing without detracting from the accuracy with which motion information is detected.

More specifically, in accordance with the present invention, there is provided an image processing system in which mask information is generated automatically by performing motion detection processing. As a result, the burden upon the operator is greatly reduced and moving pictures can be combined more easily. Further, according to the present invention, there is provided a high-speed image processing system in which mask information is utilized when coding a combined image, thereby facilitating detection of motion vectors and making possible a reduction in the amount of processing without lowering accuracy.

Other features and advantages of the present invention will be apparent from the following description taken in conjunction with the accompanying drawings, in which like reference characters designate the same or similar parts throughout the figures thereof.

DESCRIPTION OF THE DRAWINGS

FIG. 2a-2c is an explanatory view showing the manner in which moving pictures are combined;

FIG. 5 is a diagram showing the construction of a third embodiment and the flow of the associated processing.

DESCRIPTION OF THE PREFERRED EMBODIMENTS

Embodiments of the present invention will now be described with reference to the accompanying drawings.

<First Embodiment>

Figure 1:
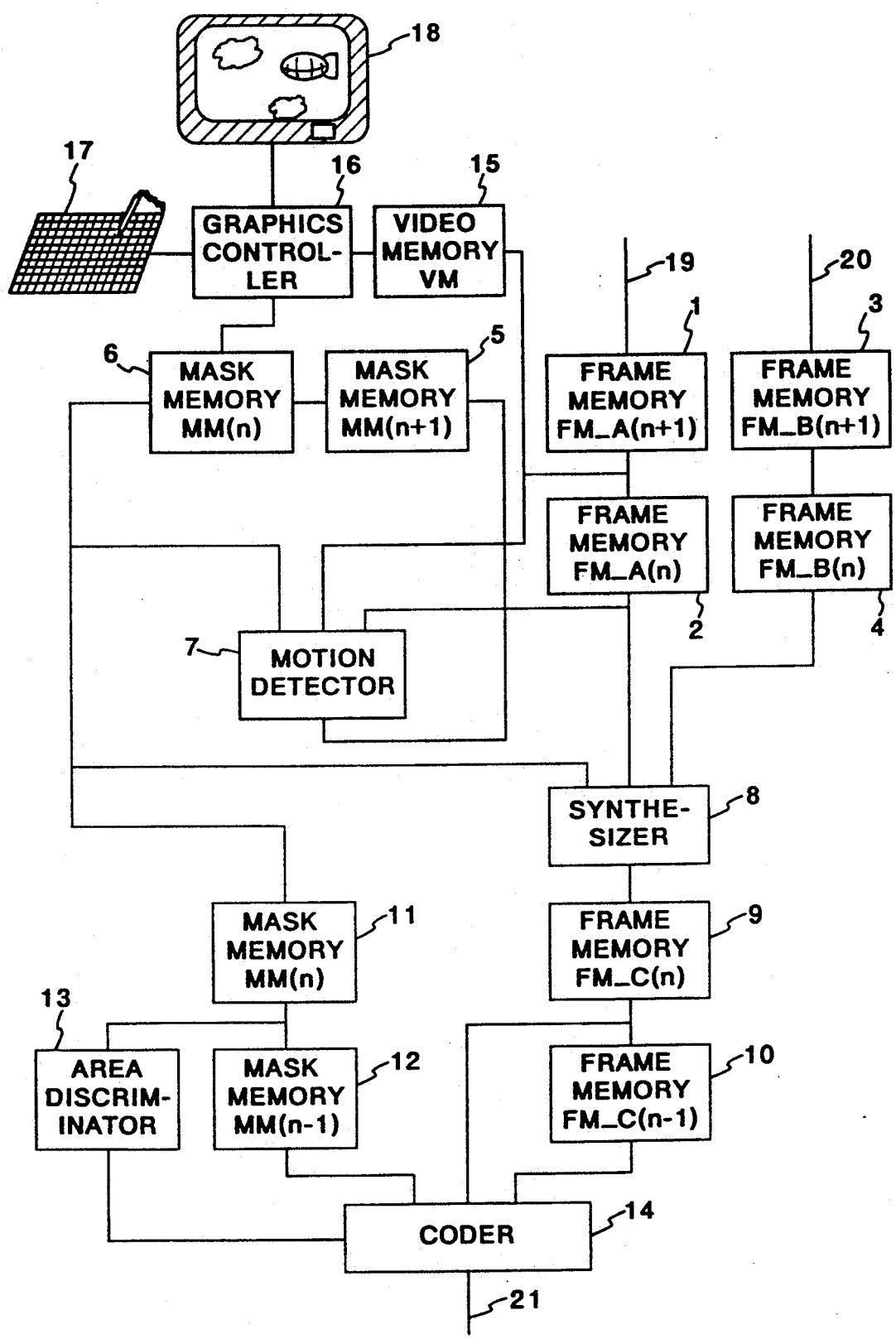
FIG. 1 is a diagram showing the construction of a first embodiment and the flow of the associated processing.

FIG. 1 is a diagram for describing the construction of a first embodiment and the flow of the associated processing.

As shown in FIG. 1, numerals 1, 2, 3, 4, 9 and 10 denote frame memories for storing a moving picture in frame units, and numerals 5, 6, 11 and 12 denote mask memories for storing mask information. The system further includes a motion detector 7 for detecting motion information; a synthesizing unit 8 for combining two images based upon the mask information; an area discriminating unit 13 for determining whether a coding region (a block unit in this embodiment) is inside a mask area or outside the mask area; a coder 14 for coding a combined image; a video memory 15 for storing a frame image; a digitizer 17, a display 18; and a graphics controller 16 for generating mask information in the mask memory 6 by controlling the video memory 15, display 18 and digitizer 17.

Figure 3:
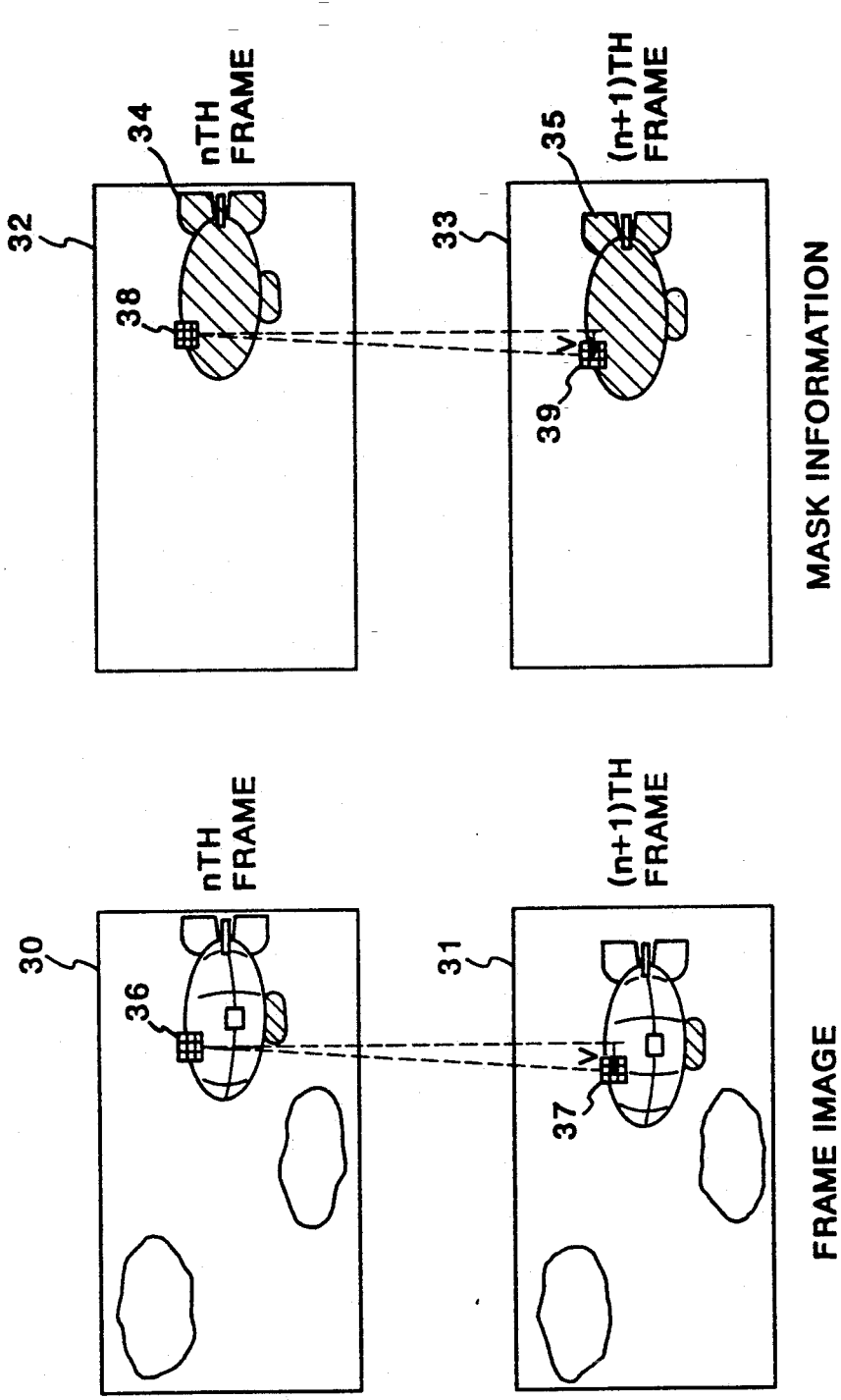
FIG. 3 is an explanatory view showing the manner in which mask information is generated.

FIG. 2 is an explanatory view showing the manner in which two moving pictures are combined. In FIG. 2, (A), (B) and (C) are moving pictures each comprising m-number of frames. The uppermost frame represents a $0^{th}$ frame (initial frame), the middle frame an $n^{th}$ frame, and the lowermost frame an $(m-1)^{th}$ frame (final frame). The moving picture (C) is the result of combining the moving picture (A), which includes a subject to be cut out (an airship in this case), and the moving picture (B), which constitutes the background against which the cut-out subject is pasted. The shape of the airship constitutes the mask information. FIG. 3 illustrates mask information corresponding to the moving picture (A).

The operation of this embodiment [namely the operation for synthesizing the moving picture (C) from the moving pictures (A) and (B) of FIG. 2] will be described based upon FIG. 1. The construction of this embodiment is classified broadly into four sections, namely a section for generating initial mask information, a section for detecting motion and generating mask information, a synthesizing section, and a coding section.

The section for generating initial mask information will be described first.

The generation of mask information is carried out in the initial frame of a moving picture, namely in the $0^{th}$ frame. The $0^{th}$ frame images of the moving pictures (A) and (B) enter from signal lines 19, 20 and are stored in frame memories 1, 3, respectively. The content of frame memory 1 is transferred to the video memory 15. When this is done, the graphics controller 16 causes the content [the 0th frame image of moving picture (A) in this case] of the video frame memory 15 to be displayed on the display 18. Accordingly, while observing the image on the screen of the display 18, the operator (not shown) uses a pen of the digitizer 17 to trace the outline of the subject to be cut, thereby entering the shape of the subject, namely the airship. At this time the graphics controller 16 displays the entered outline on the display 18 based upon the coordinates inputted from the digitizer 17. When entry of the outline ends, the graphics controller 16 generates mask information by assigning a "1" to each of the pixels in the area enclosed by the outline and a "0" to each of the pixels in the area outside the outline. The mask information generated is held in the mask memory 6. Thus, the mask information is entered. The processing for generating the initial mask information is executed only once, namely at the time of the $0^{th}$ frame.

The section for detecting motion and generating mask information, the synthesizing section, and the coding section will now be described.

The section for detecting motion and generating mask information will be described first. This involves processing for detecting a motion vector from two consecutive images [an $n^{th}$ frame image and an $(n+1)^{th}$ frame image], updating the mask information, which prevails at the time of the $n^{th}$ frame, based upon the detected motion vector, and updating the mask information which prevails at the time of the $(n+1)^{th}$ frame.

Assume that the $(n+1)^{th}$ frame images of moving pictures (A) and (B) have been stored in the frame memories 1 and 3, respectively, and that the $n^{th}$ frame images of moving pictures (A) and (B) have been stored in the frame memories 2 and 4, respectively. The motion detector 7 obtains the motion vector from the $(n+1)^{th}$ frame image of moving picture (A) in frame memory 1 and the $n^{th}$ frame image of moving picture (A) in frame memory 2. At this time the motion information is obtained solely for pixel blocks for which the mask information at the time of the $n^{th}$ frame is "1". On the basis of the detected motion vector, the mask information prevailing at the time of the $n^{th}$ frame is updated to generate mask information prevailing at the time of the $(n+1)^{th}$ frame. This newly generated mask information is stored in the mask memory 5. Thus, by detecting motion, it is possible to update the mask information automatically.

Processing for detecting motion information and processing for generating mask information prevailing at the time of the $(n+1)^{th}$ frame will now be described in detail with reference to FIG. 3.

As shown in FIG. 3, numeral 30 denotes the $n^{th}$ frame image of moving picture (A), and numeral 31 denotes the $(n+1)^{th}$ frame image of moving picture (A). Numeral 32 denotes mask information prevailing at the time of the $n^{th}$ frame, and numeral 33 denotes mask information prevailing at the time of the $(n+1)^{th}$ frame. Numerals 34, 35 correspond to the shape of the subject to be cut; these are portions for which the mask information is "1". Numerals 36, 37, 38 and 39 denotes blocks serving as units of motion detection. The blocks 36, 38 correspond, and so do the blocks 37, 39.

The block 38 in the mask information 38 will be described. Here it is assumed that the block-matching method is used as the motion detecting algorithm, that block size is 4×4, and that the search area (range of motion) is 32×32. It should be noted, however, that the motion detecting algorithm is not limited to the above. In accordance with the block-matching method, the $(n+1)^{th}$ frame image 31 is searched for a block, of the identical block size, having a luminance-value pattern similar to that of the block 36 which, in the $n^{th}$ frame image 30, corresponds to block 38, and then the motion vector is found. More specifically, let $x_{i,j}$ ($i=1-4$, $j=1-4$) represent a pixel value in the block 36, and let $y_{i,j}$ ($i=1-4$, $j=1-4$) represent a pixel value in any block within the search area of the $(n+1)^{th}$ frame image. The scale D representing the difference between the blocks is as follows:

$$D = \sum_{i=1}^{4} \sum_{j=1}^{4} (x_{i,j} - y_{i,j})^2$$

The block searched for is that which will minimize D. Here it is assumed that block 37 is the block which will minimize D. Accordingly, information relating to movement from block 36 to block 37, namely a motion vector v, is obtained as indicated by the arrow in the $(n+1)^{th}$ frame image 31. Then, the corresponding block 38 is moved to block 39 using the motion vector v, and mask information "1" is stored at the corresponding pixel. This processing is applied to all pixels of the mask 34 in mask information 32 of mask memory 6, and the mask information 33 generated from the mask information 32 in mask memory 6 is stored in the mask memory 5. The mask information is updated sequentially based upon these processing steps.

The synthesizing section will be described next.

This involves processing through which the image cut from the image (A) in frame memory 2 based upon the mask information in mask memory 6 is superimposed upon and combined with the image (B) in frame memory 4 by means of the synthesizer 8, and the result of this synthesis is written in the frame memory 9. More specifically, pixel data at identical pixel positions in the frame memories 2, 4 are inputted to the synthesizer 8, and the mask information of these pixel positions is inputted to the synthesizer 8 from the mask memory 6. The synthesizer 8 outputs the pixel data of image (B) in frame memory 4 if the mask information is "0", or the pixel data of image (A) in frame memory 2 if the mask information is "1".

With regard to the coding section, this involves executing processing for coding the image synthesized in the $n^{th}$ frame. At this time, motion-compensating prediction is performed to carry out coding efficiently. Further, the mask information is utilized effectively to reduce the amount of processing without detracting from the detection accuracy of the motion information.

First, the block data of the $n^{th}$ frame enters the coder 14 from the frame memory 9. At this time, processing is executed in which the search range for obtaining the corresponding block from the $(n-1)^{th}$ frame through block matching is changed depending upon whether this block contains an area cut from the moving picture (A). To this end, the mask information of the identical block position is inputted to the area discriminator 13 from the mask memory 11. If the mask information within the block contains a "1", then the discriminator 13 sends "1" to the coder 14; otherwise, the discriminator 13 sends "0" to the coder 14. If the output of the discriminator 13 is "0", the coder 14 obtains the corresponding block by an ordinary search. If the output of the discriminator 13 is "1", on the other hand, the coder 14 refers to the mask information of the $(n-1)^{th}$ frame in mask memory 12 and obtains the corresponding block by performing a search only in the area containing the portion for which the mask information is "1", because there should exists the mask information "1" in the corresponding block. Then, the motion vector is obtained based on the movement of the position between the input block and the corresponding block obtained. Thus, processing for detecting the motion vector is reduced, as it becomes possible to make the search range narrow without lowering the estimation accuracy of the motion vector in the block within the cut-out area.

Next, coding is carried out with regard to the motion vector and block data which is the difference between the block of the $n^{th}$ frame image in frame memory 9 and the block of the $(n-1)^{th}$ frame image in frame memory 10. The coding is carried out using a technique such as discrete cosine transformation (DCT) or vector quantization (VQ). By using a table decided in advance with regard to the coded data, quantization is performed and the coded data is sent from data line 21.

Since the $0^{th}$ frame does not contain the image of a preceding frame, intra coding within this frame is executed and the results are transmitted. Thereafter, the content of mask memory 11 is transferred to the mask memory 12, the content of frame memory 9 is transferred to the frame memory 10, the content of mask memory 5 is transferred to the mask memory 6, and processing is repeated.

<Second Embodiment>

Figure 4:
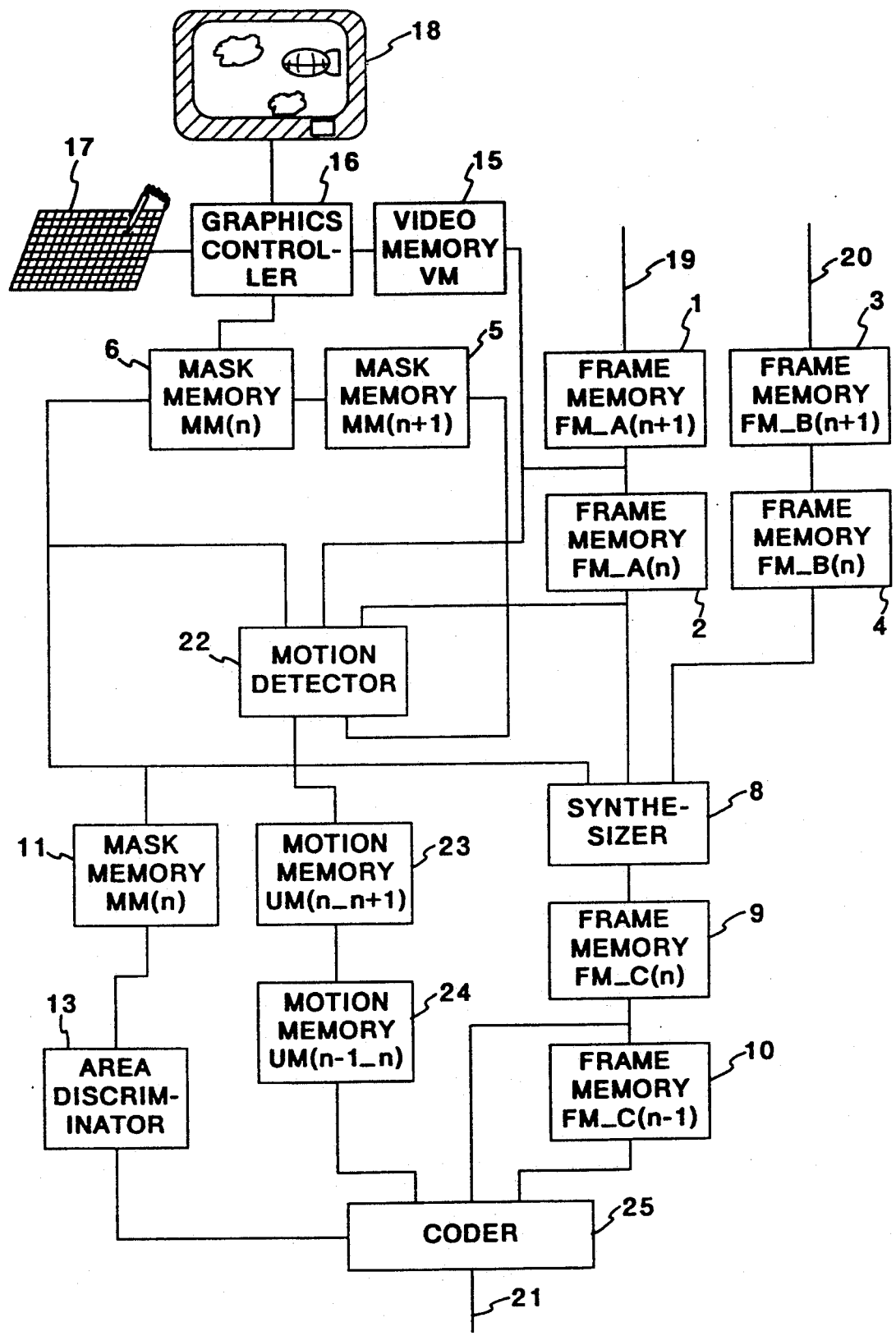
FIG. 4 is a diagram showing the construction of a second embodiment and the flow of the associated processing.

FIG. 4 is a diagram for describing the construction of a second embodiment and the flow of the associated processing.

Portions in FIG. 4 identical with those of the first embodiment of FIG. 1 are designated by like reference numerals.

In FIG. 4, reference numeral 22 denotes a motion detector for outputting detected motion vector information as well as new mask information generated based upon the motion vector information. Numerals 23 and 24 designate motion memories for storing motion vector information in units (blocks or pixels) extracted from motion information. Numeral 25 denotes a coder.

In the second embodiment, motion vector information detected by the motion detector 22 is held in the motion memories 23, 24 and is utilized when coding is performed. The method of detecting motion vector information is the same as in the first embodiment. The detected motion vector information is stored in the motion memory 23 in correspondence with the position of the $(n+1)^{th}$ frame. The result is copied in the motion memory 24 through delay processing of one frame. Next, in motion-compensating prediction coding of the synthesized image performed in the coder 25, use is made of the motion vector information in this motion memory. That is, the motion vector is obtained within the cut-out area (the "1" region in the mask information). Therefore, when the interior of the cut-out area is coded, processing is executed for reading the motion vector information out of the motion memory 24 without performing motion detecting processing. Thus, the motion information obtained when updating the mask information is utilized in coding as well, thereby reducing the amount of motion detecting processing. Outside the cut-out area, motion-compensating prediction is performed by executing ordinary motion detecting processing.

<Third Embodiment>

FIG. 5 is a diagram for describing the construction of a third embodiment and the flow of the associated processing.

Portions in FIG. 5 identical with those of the first and second embodiments in FIGS. 1 and 4 are designated by like reference numerals.

In FIG. 5, reference numerals 40, 41 denote data lines for inputting coded data, and reference numerals 43, 44 denote decoders for decoding the coded data. Numeral 42 denotes a motion separator which, upon receiving data relating to a motion vector from decoder 43, outputs motion information represented by the motion vector as well as mask information of the present frame generated based upon the motion information.

In the third embodiment, the input is not the image signal per se; rather, the input is the coded image data. The coded data of the 0$^{th}$ frames of moving pictures (A), (B) which enters from the data lines 40, 41 is the result of coding performed within the frames. Accordingly, decoding suited to this data is performed by the decoders 43, 44, and the decoded images (A), (B) are stored in the frame memories 1, 3, respectively.

In a case where the images of the (n+1)$^{th}$ frames enter from the data lines 40, 41, decoding is performed by the decoders 43, 44 using the images of the n$^{th}$ frames as reference images since the coded data is the result of coding between frames. At the same time, the motion separator 42 refers to the mask information in the mask memory 6 to separate and extract, from the coded data, the motion vector information of the blocks within the cut-out area. The separator 42 sends the separated information to the motion memory 23 and, at the same time, generates mask information which prevails at the time of the (n+1)$^{th}$ frame and stores this information in the mask memory 5. Thus, it is possible to execute processing of a plurality of moving pictures upon inputting coded data indicative of the images.

In the processing described above, the block-matching method is employed as the technique for detecting motion. However, this does not impose a limitation, for a detecting technique utilizing the gradient method or the like may also be used. At such time, not only the image of the preceding frame but also the images of frames prior thereto may be utilized, thereby making it possible to detect motion information more stably.

Further, in the foregoing embodiments, mask information is utilized in detecting motion. However, it is possible also to refer to mask information when adaptively assigning coded bits. That is, processing is possible in which a large number of bits are assigned by the cut-out area.

In addition, any coding technique may be employed as long as it is an efficient one. Further, the image data is not limited to multi-level image data but may be bi-level image data. Also, the construction of the invention is not limited to that illustrated, and it is possible to make changes such as by sharing frame memories, mask memories and decoders. The number of moving pictures processed is not limited to two; three or more moving pictures can be processing by making a simple modification. Furthermore, detection of motion, the generation of mask information, synthesizing and coding can be realized by parallel pipeline processing, whereby processing speed can be raised.

As many apparently widely different embodiments of the present invention can be made without departing from the spirit and scope thereof, it is to be understood that the invention is not limited to the specific embodiments thereof except as defined in the appended claims.

What is claimed is:

1. An image processing system for combining a plurality of images, which include at least a time-varying image, said system comprising:

mask data memory means for storing mask data designating area(s) of the time-varying image in the plurality of images to be combined;

first image memory means for storing a present image of the time-varying image;

second image memory means for storing a preceding image of the time-varying image;

detection means for detecting a motion of the time-varying image based on the present image and the preceding image stored in said first and second image memory means respectively;

updating means for updating mask data stored in said mask data memory means based on the motion of the time-varying image detected by said detection means; and combining means for combining the present image of the time-varying image with other images(s) of the plurality of images on a basis of mask data updated by said updating means.

2. The image processing system according to claim 1, further comprising:

third image memory means for storing a present combined image combined by said combining means;

fourth image memory means for storing a preceding combined image combined by said combining means;

second mask data memory means for storing a preceding mask data corresponding to the preceding combined image;

discrimination means for discriminating which original image of the plurality of images is included in an area of the combined image based on the mask data;

second detection means for detecting a motion of the area of the combined image by referring to both areas of the preceding combined image and a present combined image including a same original image; and coding means for coding an area of the combined image by motion compensation predictive coding by using the motion detected by said second detection means.

3. The image processing system according to claim 1, further comprising:

motion memory means for storing the motion of the time-varying image detected by said detection means;

third image memory means for storing a present combined image combined by said combining means;

fourth image memory means for storing a preceding combined image combined by said combining means;

second mask data memory means for storing a preceding mask data corresponding to the preceding combined image;

discrimination means for discriminating whether an area of the combined image includes the time-varying image based on the mask data;

second detection means for detecting a motion of an area of the present image discriminated not to include the time-varying image; and coding means for coding the combined image by motion compensation predictive coding by using the motion stored in said motion memory means or the motion detected by said second detection means.

4. An image processing method for combining a plurality of images, which include at least one time-varying image, said method comprising the steps of:

storing mask data designating area(s) of the time-varying image in the plurality of images to be combined in a mask data memory;

storing a present time-varying image and a preceding time-varying image in an image memory;

detecting a motion of the time-varying image based on the present and the preceding time-varying image;

updating the mask data stored in the mask data memory based on the detected motion of the time-varying image; and combining the present time-varying image with other image(s) of the plurality of images on a basis of the updated mask data.

5. An image processing method for combining a plurality of images, which include at least one time-varying image, said method comprising the steps of:

storing mask data designating area(s) of the time-varying image in the plurality of images to be combined in a mask data memory;

storing a present time-varying image and a preceding time-varying image in an image memory;

detecting a motion of the time-varying image based on the present and the preceding time-varying image;

creating a present mask data from a preceding mask data stored in the mask data memory based on the detected motion of the time-varying image; and combining the present time-varying image with other image(s) of the plurality of images on a basis of the present mask data.

6. The image processing method according to claim 5, wherein the detection is executed by referring, as the preceding time-varying image, only to a portion designated to be combined by the mask data.

7. An image processing method for combining a plurality of images, which include at least one time-varying image, said method comprising the steps of:

storing mask data designating area(s) of the time-varying image in the plurality of images to be combined in a mask data memory;

storing a present time-varying image and a preceding time-varying image in an image memory;

detecting a motion of the time-varying image based on the present and the preceding time-varying image;

updating mask data stored in the mask data memory based on the detected motion of the time-varying image;

combining the present time-varying image with other image(s) of the plurality of images on a basis of the updated mask data;

cutting out an area to be encoded from the combined image;

judging whether the cut out area contains the time-varying image with reference to the mask data;

determining an encoding method according to the judging; and encoding the cut out area by the determined encoding method.

8. The image processing method according to claim 7, wherein when the area to be encoded is judged to contain the time-varying image, an encoding method is selected which comprises the steps of searching an area in a preceding combined image corresponding to the area to be encoded, with limiting a search range within the area containing the time-varying image in reference to the mask data;

detecting a motion based on the searched area and the area to be encoded;

getting a difference between the searched area and the area to be encoded; and encoding the motion and the difference.

9. An image processing method for combining a plurality of images, which include at least one time-varying image, said method comprising the steps of;

storing mask data designating area(s) of the time-varying image in the plurality of images to be combined in a mask data memory;

storing a present time-varying image and a preceding time-varying image in an image memory;

detecting a motion of the time-varying image based on the present and the preceding time-varying image;

updating mask data stored in the mask data memory based on the detected motion of the time-varying image;

combining the present time-varying image with other image(s) of the plurality of images on a basis of the updated mask data;

cutting out an area to be encoded from the combined image;

judging whether the cut out area contains the time-varying image with reference to the mask data; and encoding the cut out area based on the detected motion when the area is judged to contain the time-varying image.

10. The image processing method according to claim 9, wherein the encoding step comprises the steps of:

determining an area in the preceding combined image corresponding to the area to be encoded based on the detected motion;

getting a difference between the determined area and the area to be encoded; and encoding the motion and the difference.

11. An image processing method for combining a plurality of images, which include at least one encoded time-varying image, said method comprising the steps of:

extracting a motion data from the encoded time-varying image;

decoding the encoded time-varying image by using the motion data;

storing a present decoded time-varying image in an image memory;

storing mask data designating areas of each of the plurality of images to be combined in a mask data memory;

updating a mask data stored in the mask data memory based on the extracted motion data;

combining the present time-varying image with other image(s) of the plurality of images on a basis of the updated mask data;

cutting out an area to be encoded from the combined image;

judging whether the cut out area contains the time-varying image with reference to the mask data; and encoding the cut out area based on the extracted motion when the area is judged to contain the time-varying image.

\* \* \* \* \*

UNITED STATES PATENT AND TRADEMARK OFFICE
CERTIFICATE OF CORRECTION

PATENT NO. : 5,274,453
DATED : December 28, 1993
INVENTOR(S) : MITSURU MAEDA

It is certified that error appears in the above-identified patent and that said Letters Patent is hereby corrected as shown below:

On the title page: Item

[56] REFERENCES CITED

Other Publications, "Ottwawa," should read --Ottawa,--.

COLUMN 7

Line 46, "processing" should read --processed--.

COLUMN 8

Line 8, "images(s)" should read --image(s)--.

Signed and Sealed this

Twenty-sixth Day of July, 1994

Attest:

BRUCE LEHMAN

*Attesting Officer*    *Commissioner of Patents and Trademarks*